(No Model.)
J. E. McINTOSH.
VALVE FOR STEAM ENGINES.
No. 384,637. Patented June 19, 1888.
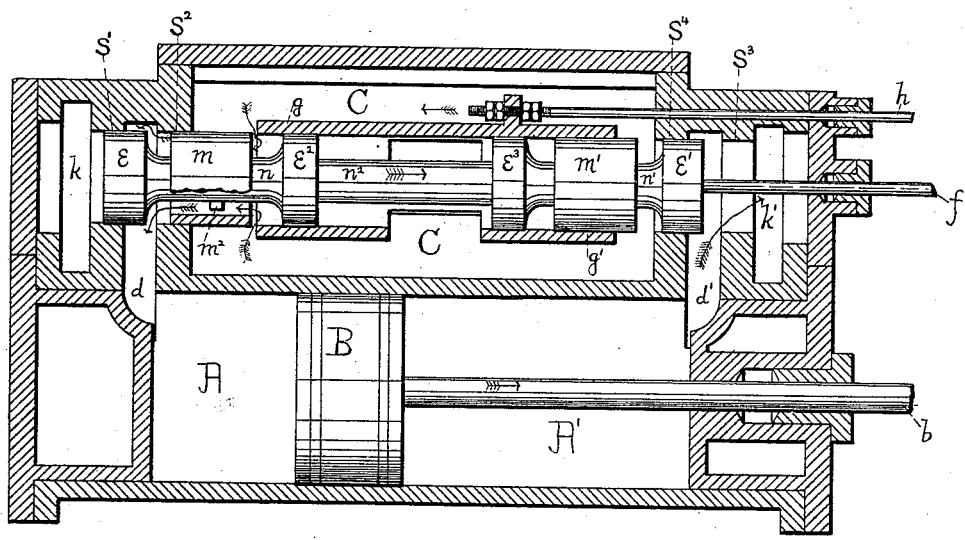
Witnesses.
Wm P Allen
George SV Nellis
Inventor.
John E. McIntosh,
by Frederick J. Allen.
Attorney.

UNITED STATES PATENT OFFICE.

JOHN E. McINTOSH, OF AUBURN, NEW YORK.

VALVE FOR STEAM-ENGINES.

SPECIFICATION forming part of Letters Patent No. 384,637, dated June 19, 1888.

Application filed May 20, 1887. Serial No. 238,825. (No model.)

*To all whom it may concern:*

Be it known that I, JOHN E. McINTOSH, of the city of Auburn, New York, have invented certain new and useful Improvements in Valves for Steam-Engines, of which the following is a description, reference being had to the accompanying drawing, of which the figure is a longitudinal section of the valves.

The object of my invention is to simplify the construction of engine-valves. This object I accomplish by means of the within-described mechanism, in which—

A A′ represent the cylinder of a steam-engine; B, its piston; $b$, the piston-rod; C, the steam-chest; $d\ d'$, the ports; K K′, the exhaust-openings.

E E′ is the valve, which is operated by means of the valve-rod $f$, and this valve I construct in the form shown in the drawing, which may be described as a valve stem or shaft, $n\ n'\ n^2$, bearing four enlarged cylindrical bearing-surfaces, $e\ e^2\ e^3\ e'$, solidly secured thereto or integral therewith, and also the cylindrical portions $m\ m'$, which are of the same exterior diameter as the portions $e\ e^2\ e^3\ e'$, and which are sustained, respectively, upon the portions of the valve-stem $n$ and $n'$ by means of spokes, so that the steam may pass through the interior, as is shown at $m$, a portion of which is represented as broken away to permit one of such spokes $m^2$ to be seen.

$g\ g'$ represent a cut-off valve, operated by means of its rod $h$, and sliding upon the cylindrical surfaces $m\ e^2\ e^3\ m'$, being itself of the cylindrical sleeve form shown in the drawing. That portion of the cut-off valve which lies between $e^2$ and $e^3$ is represented as partially cut away to obtain lightness of construction. Four valve-seats, $s'\ s^2\ s^3\ s^4$, are provided, which support the valve E E′.

The operation is as follows: In the position of the parts shown by the drawing steam enters the steam-chest C, and passes thence under $m$, around the valve-stem $n$, and through the port $d$ to the portion A of the cylinder, until the cut-off $g$ engages with $m$, and thereby prevents further access of steam to A. Meanwhile the portion $e$ engages with the seat $s'$, closing the exhaust K, while the steam in the portion A′ of the cylinder is forced out through $d'$ and K′, the portion E′ of the valve being in engagement with the seat $s^3$, and thereby cutting off the access of steam to A′, while leaving the exhaust K′ open.

Having thus described my invention, what I claim as new, and desire to secure by Letters Patent, is—

1. The combination, with the main valve consisting of the connected but separated disks $e\ e^2\ e^3\ e'$ and the hollow cylindrical parts $m$ and $m'$, the former cylindrical part being between the disks $e$ and $e^2$ and the latter between the disks $e^3$ and $e'$, of the hollow cylindrical cut-off valve fitted to slide upon the said disks, and the cylindrical parts $m$ and $m'$, and of proper length to extend from the part $m$ to the part $m'$, substantially as shown and described.

2. The combination, with a main valve consisting of a series of connected disks and two hollow cylindrical parts, one near each end of the valve, of a hollow cylindrical cut-off valve supported interiorly upon the said main valve, and two separate and independently-operating rods, one for operating the main valve and the other for operating the cut-off valve, substantially as shown and described.

JNO. E. McINTOSH.

Witnesses:
FREDERICK I. ALLEN,
WM. P. ALLEN.